US006009393A

United States Patent [19]

Sasaki

[11] Patent Number: 6,009,393

[45] Date of Patent: *Dec. 28, 1999

[54] CODE PRINTING APPARATUS

[75] Inventor: Hiroshi Sasaki, Hachioji, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,114

[22] Filed: Mar. 19, 1997

[30] Foreign Application Priority Data

Mar. 28, 1996 [JP] Japan .................................... 8-074186

[51] Int. Cl.[6] ................................ G11B 3/00; G10L 5/02

[52] U.S. Cl. .......................... 704/258; 704/214; 704/270; 369/13; 369/275.3

[58] Field of Search .................................... 704/260, 214, 704/220, 235, 270, 277, 258, 207; 369/13, 275.3

[56] References Cited

U.S. PATENT DOCUMENTS 5,059,126 10/1991 Kimball .................................. 704/260
5,384,701 1/1995 Stentiford et al. ....................... 704/260
5,644,557 7/1997 Akamine et al. ........................ 704/260
5,677,739 10/1997 Kirkland ................................. 704/260
5,698,834 12/1997 Worthington et al. .................. 704/260

FOREIGN PATENT DOCUMENTS 0 670 555 A1 9/1995 European Pat. Off. .

OTHER PUBLICATIONS

New Riverside University Dictionary, p. 277, 1994.

*Primary Examiner*—David R. Hudspeth
*Assistant Examiner*—M. David Sofocleous
*Attorney, Agent, or Firm*—Frishauf, Holtz, Goodman, Langer & Chick, P.C.

[57] ABSTRACT

A code printing apparatus includes a speech input unit for inputting speech information, a code output unit for printing the speech information input by the speech input unit on a medium as an optically readable code pattern image, and a speech code printing control unit for controlling the code output unit to print the speech information input by the speech input unit on the medium as a corresponding code pattern image on the basis of the input operation at an operation unit controlled by the user. The user can thus easily achieve a function of printing speech data or the like as an optically readable code.

16 Claims, 16 Drawing Sheets

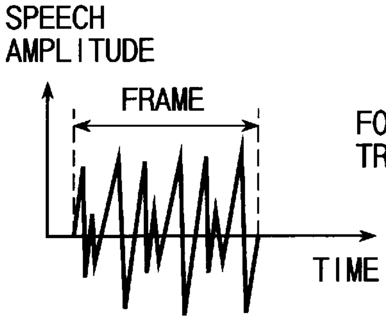
F I G. 1 8 A
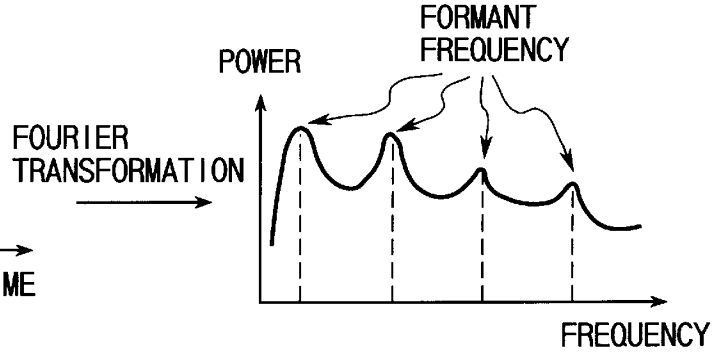
F I G. 1 8 B
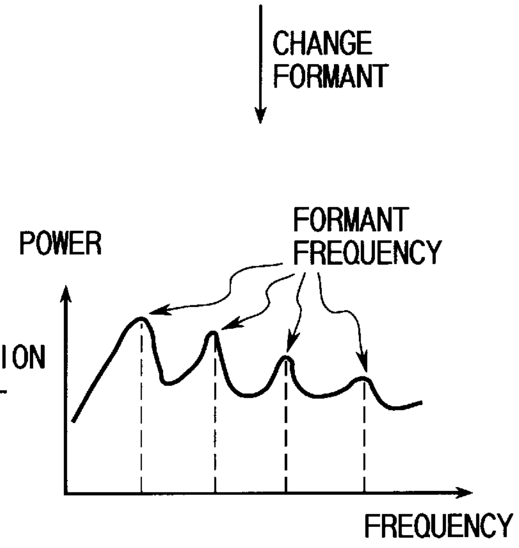
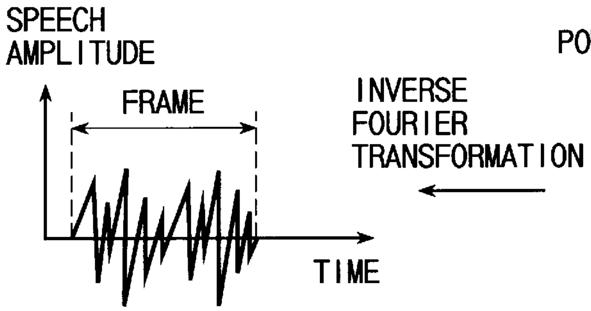
F I G. 1 8 D
F I G. 1 8 C

CODE PRINTING APPARATUS

BACKGROUND OF THE INVENTION

The present invention relates to a code printing apparatus for printing so-called multimedia information including audio information such as speech data, music data, and the like as an optically readable code pattern.

A Conventional technique that relates to a code printing apparatus for recording so-called multimedia information including audio information such as speech data, and the like as an optically readable code pattern (dot pattern) is disclosed in EP0670555A1 (U.S. Ser. No. 8/407,018)).

Furthermore, a technique for efficiently printing speech information on a limited printing region and a technique for converting input speech data into desired different speech data in correspondence with each application, and printing the data as a code pattern of speech data different from the input speech data have been demanded.

However, the conventional code printing apparatus disclosed in the above mentioned EP0670555A1, however, does not include means for allowing the user to easily use the function of printing speech information as an optically readable code, and the user cannot sufficiently use this function.

Furthermore, the above mentioned EP0670555A1 also does not disclose either a technique for efficiently printing speech information in a limited printing region or a technique for printing the input voice as a voice different from the input voice.

BRIEF SUMMARY OF THE INVENTION

The present invention has been made in consideration of the above-mentioned problems, and has as its object to allow a user to easily use the function of printing speech or the like as an optical readable code and to efficiently print speech information within a limited printing region.

According to one aspect of the present invention, there is provided a code printing apparatus which comprises speech input means for inputting speech information and code printing means for printing the speech information input by the speech input means as an optically readable code pattern image on a medium, comprising an operation unit, and speech code printing control means for controlling the code printing means to print the speech information input by the speech input means as a corresponding pattern image on the medium on the basis of an input operation at the operation unit.

Furthermore, according to another aspect of the present invention, there is provided a code printing apparatus which comprises speech input means and code printing means for printing speech information input by the speech input means as an optically readable code pattern image on a medium, comprising voice changing means for changing a voice of the speech information input by the speech input means.

Moreover, according to still another aspect of the present invention, there is provided a code printing apparatus which comprises speech input means and code printing means for printing speech information input by the speech input means as an optically readable code pattern image on a medium, comprising sound quality changing means for changing sound quality data of the speech information input by the speech input means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 18A is a chart showing a speech signal per frame, FIG. 18B is a graph showing the characteristics after Fourier transformation, FIG. 18C is a graph showing the characteristics after processing for shifting peaks is executed, and FIG. 18D is a chart showing a speech signal obtained by inverse Fourier transformation of the signal shown in FIG. 18C;

DETAILED DESCRIPTION OF THE INVENTION

The preferred embodiments of the present invention will be described hereinafter with reference to the accompanying drawings.

Figure 1:
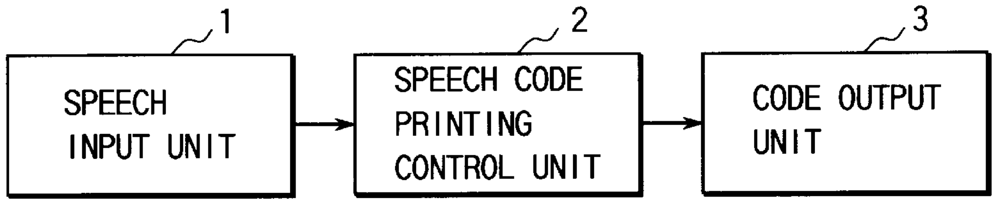
FIG. 1 is a block diagram showing the arrangement of a code printing apparatus according to the first embodiment of the present invention.

FIG. 1 shows the arrangement of a code printing apparatus according to the first embodiment of the present invention. A code printing apparatus of the first embodiment will be described below. As shown in FIG. 1, the code printing apparatus comprises a speech input unit 1, a code printing control unit 2, and a code output unit 3.

With this arrangement, when a user inputs a voice from the speech input unit 1 via a microphone, an external input terminal, or the like, the input analog speech signal is converted into a digital signal, which is input to the speech code printing control unit 2. The speech code printing control unit 2 extracts only significant data, e.g., speech information during the vocal-activity period (talkspurts), from the input speech signal, and outputs the extracted information to the code output unit 3. The code output unit 3 converts the speech information into code information, and prints the code information on a printing medium.

Figure 2:
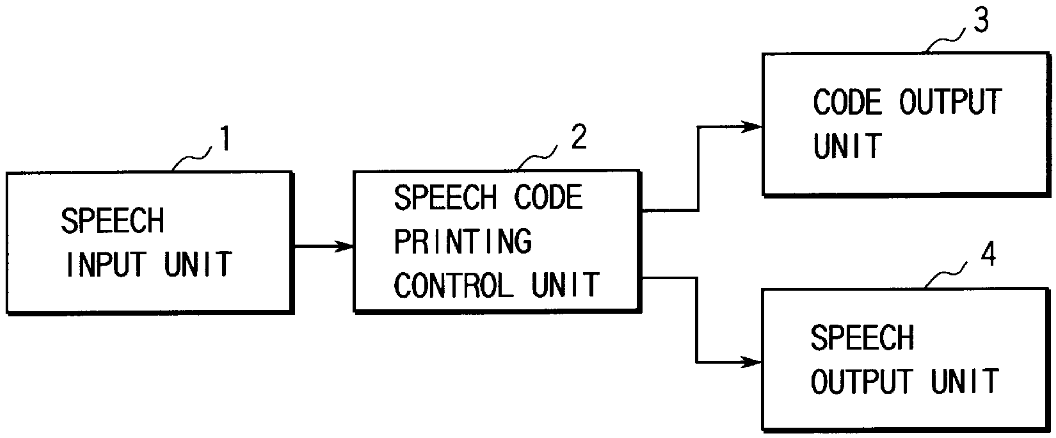
FIG. 2 is a block diagram showing the arrangement of a code printing apparatus according to a modification of the first embodiment.

FIG. 2 shows the arrangement of a code printing apparatus according to a modification of the first embodiment, and the apparatus according to the modification will be described below. The arrangement of the apparatus shown in FIG. 2 is substantially the same as that shown in FIG. 1, except that the output from the speech code printing control unit 2 is further connected to a speech output unit 4.

When the speech output unit 4 receives significant speech code information from the speech code printing control unit 2, it adds no-activity information removed previously to the input significant information including control information, and outputs the sum information as the same speech information as the input information.

Figure 3:
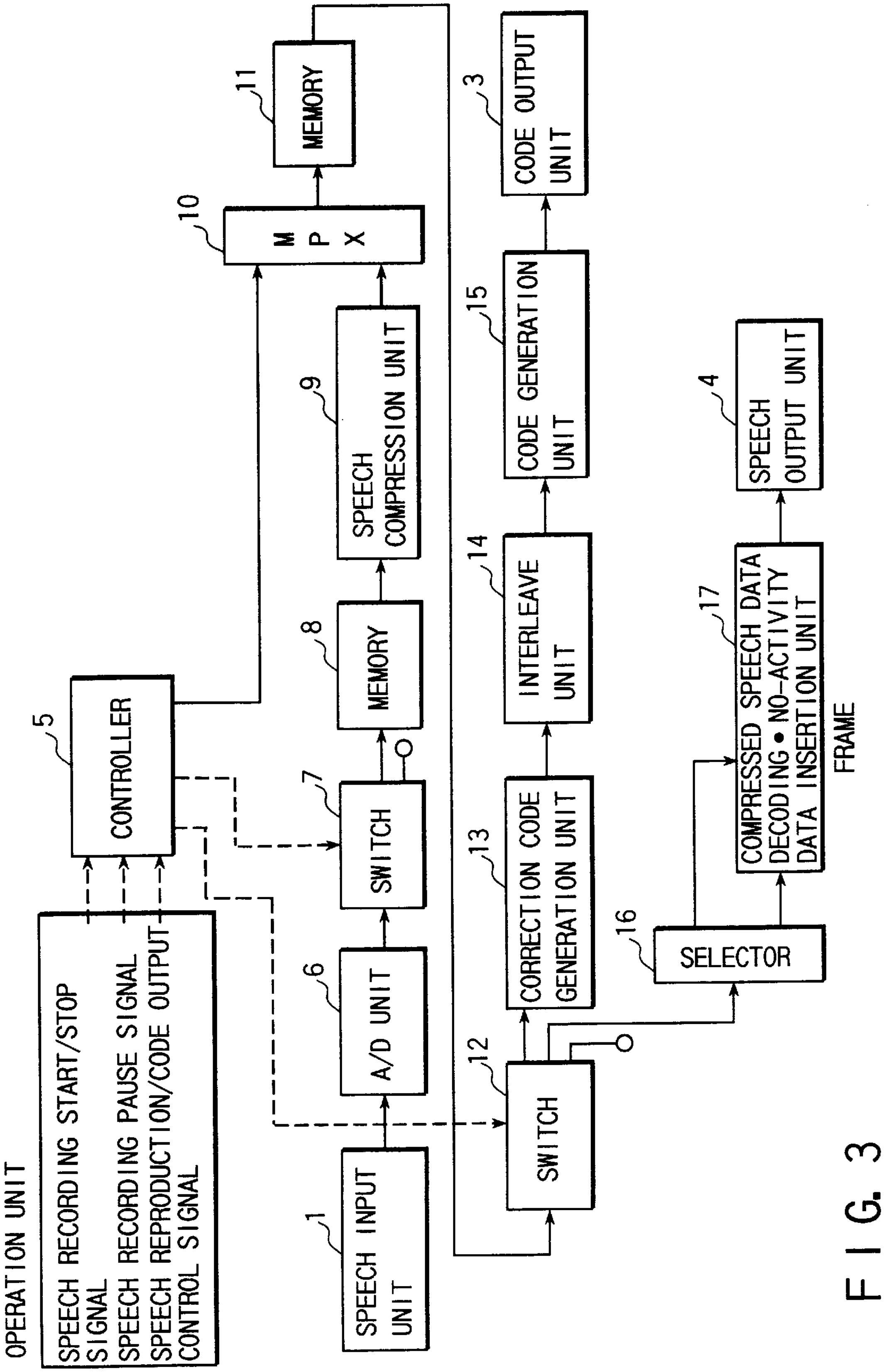
FIG. 3 is a block diagram showing in detail the arrangement of the code printing apparatus with the arrangement shown in FIG. 2.

FIG. 3 shows in more detail the arrangement of the code printing apparatus with the arrangement shown in FIG. 2, and the apparatus with this arrangement will be described below. As shown in FIG. 3, the output of the speech input unit 1 is connected to the input of a multiplexer (MPX) 10 via an A/D unit 6, a switch 7, a memory 8, and a speech compression unit 9, and the inputs of the switch 7 and the multiplexer 10 are connected to the output of the controller 5. The output of the multiplexer 10 is connected to a memory 11, the output of which is connected to the code output unit 3 via a switch 12, a correction code generation unit 13, an interleave unit 14, and a code generation unit 15. Furthermore, the switch 12 is connected to the speech output unit 4 via a selector 16 and a compressed speech data decoding·no-activity data insertion unit 17. Note that the output of the controller 5 is also connected to the switch 12.

In this arrangement, when a user generates a speech recording start signal at an operation unit, and a speech signal is input from the speech input unit 1 via a microphone or the like, the speech signal is A/D-converted into digital data by the A/D unit 6, and the digital data is input to the switch 7 side. At this time, when a speech recording pause signal is input to the controller 5 by pressing a manual switch (not shown) on the operation unit, the controller 5 ON/OFF-controls the switch 7 in accordance with the input signal.

More specifically, when the speech recording pause signal is OFF, the switch 7 is connected to the memory 8 side; when the speech recording pause signal is ON, the switch 7 is disconnected from the memory 8.

Therefore, when the speech recording pause signal is OFF, digital data from the A/D unit 6 is input to the memory 8 via the switch 7, and speech data in the memory 8 is compressed by the speech compression unit 9. Thereafter, the compressed speech data is input to the multiplexer 10.

On the other hand, the controller 5 outputs, to the multiplexer 10, a signal indicating the ON/OFF state of speech recording, i.e., vocal-activity/no-activity information when the speech recording stop period corresponds to the no-activity period, and the speech recording period corresponds to the vocal-activity period, in accordance with the speech recording pause signal. The multiplexer 10 synthesizes two pieces of information, and outputs the synthesized information to the memory 11 to store it in the memory 11.

The compressed speech data stored in the memory 11 is input to the switch 12 and the subsequent circuits. The controller 5 ON/OFF-controls the switch 12 on the basis of a speech reproduction·code output control signal. More specifically, when the user selects a code output signal, the switch 12 is connected to the correction code generation unit 13 side; when the user selects a speech reproduction signal, the switch 12 is connected to the selector 16 side.

When the switch 12 is connected to the correction code generation unit 13 side, the compressed speech data is input to the correction code generation unit 13, which adds an error correction code to the compressed speech data. The sum information is input to the interleave unit 14 to re-arrange data. The re-arranged data is input to the code generation unit 15, and is converted into optically readable dot code data. The code data output as a dot code is input to the code output unit 3, and is printed on a printing medium.

On the other hand, when the switch 12 selects the speech reproduction signal, the speech information is input to the selector 16, which separates the input information into vocal-activity/no-activity information and a speech information portion corresponding to the vocal-activity information and inputs them to the compressed speech data decoding·no-activity data insertion unit 17. The compressed speech data decoding·no-activity data insertion unit 17 decodes the compressed speech data, and inserts a no-activity signal in the decoded data using the vocal-activity/no-activity information. The decoded speech data with the no-activity signal is output to the speech output unit 4, and is converted into analog data. Thereafter, the analog data is output as an actual voice from a loudspeaker or the like.

Figure 4:
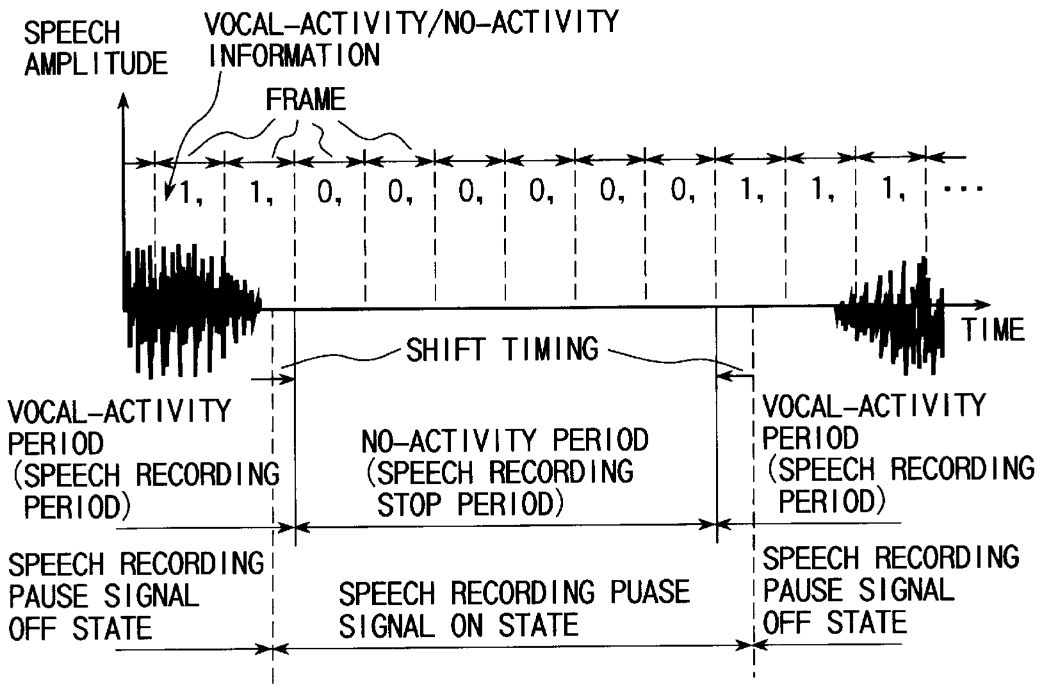
FIG. 4 is a chart for explaining the control of a controller 5.

The control of the controller 5 will be described in detail below with reference to FIG. 4. As shown in FIG. 4, speech information is controlled in units of frames. Note that each frame corresponds to a predetermined number of speech samples, and corresponds to speech data at, e.g., 30-msec intervals in this embodiment. In units of such frames, as the vocal-activity/no-activity information, “1” is recorded in the vocal-activity state, and “0” is recorded in the no-activity state.

When the speech recording pause signal has changed from OFF to ON, and the change timing does not match the boundary between adjacent frames, the controller 5 delays the timing in correspondence with the boundary between adjacent frames, thereby setting the no-activity period.

When the speech recording pause signal has changed from ON to OFF, and the change timing does not match the boundary between adjacent frames, the controller 5 advances the timing in correspondence with the boundary between adjacent frames, thus terminating the no-activity period. This is because if the ON period of the speech recording pause signal is longer than the no-activity period, a period recording a voice in fact may be deleted.

In this manner, the no-activity period is controlled by the controller 5 to become shorter than the ON period of the speech recording pause signal and to match the frame unit. Only the vocal-activity information “1” is input from the memory 8 to the speech compression unit 9 while deleting the no-activity period information “0”, and the compressed information is input to the multiplexer 10.

Data for informing whether or not the no-activity period information is deleted is the vocal-activity/no-activity information, which is output from the controller 5 to the multiplexer 10. More specifically, a bit sequence of “1”s and “0”s as the vocal-activity/no-activity information is input to the multiplexer 10, and is synthesized as header information with the compressed data.

When the compressed data is reproduced, the data is separated into the header portion and the compressed speech data when it is input from the switch 12 to the selector 16, and the compressed data is decoded (expanded) to speech data first. With this processing, speech data from which the no-activity period portions are removed can be generated. Thereafter, since no-activity periods can be determined in units of frames on the basis of the vocal-activity/no-activity information, no-activity information is inserted in the corresponding portions.

According to the first embodiment described above, speech information can be easily printed on a medium as an optically readable code pattern image in accordance with the operator’s will. Furthermore, speech data to be printed as the code pattern image on the medium can be selectively confirmed as needed.

Figure 5:
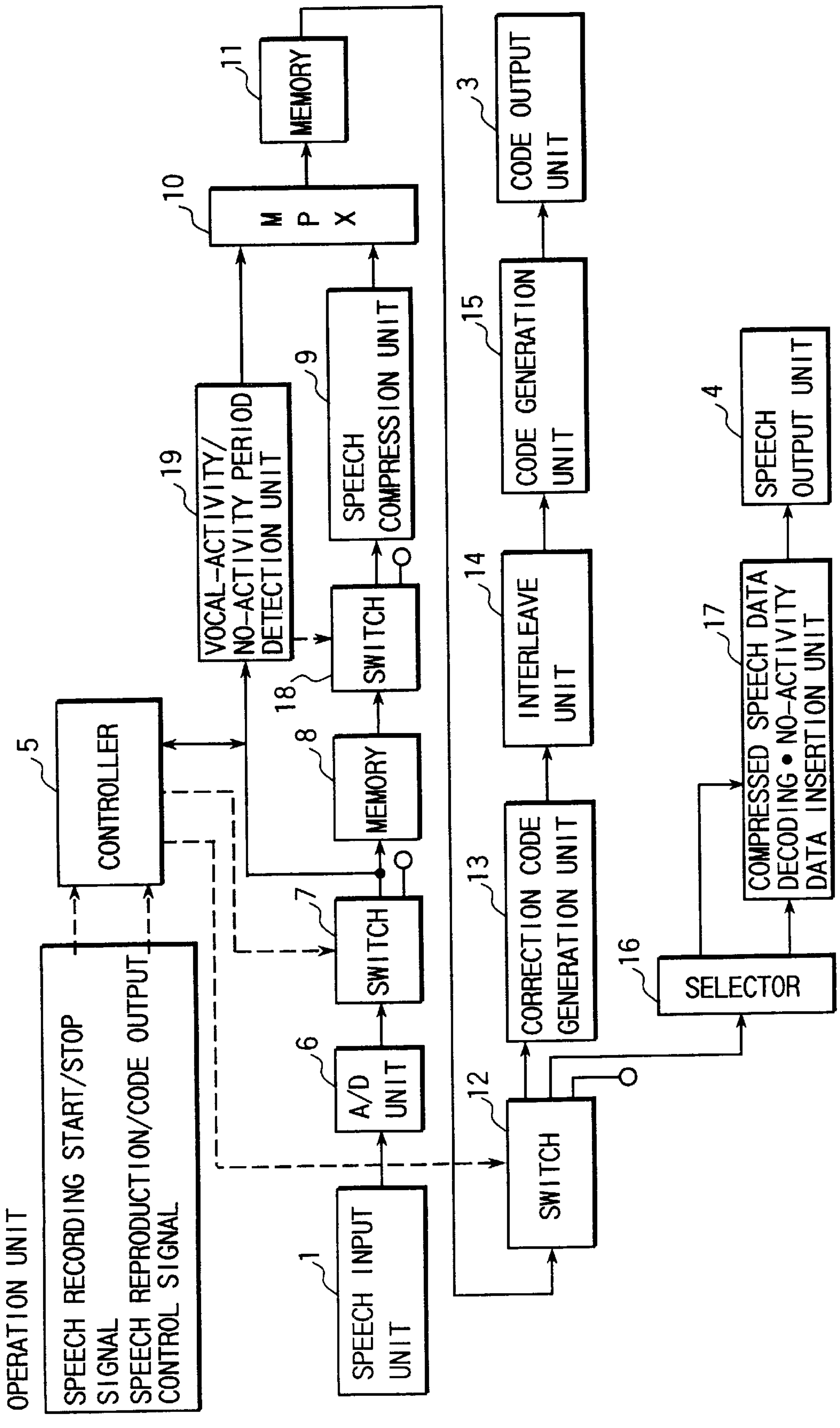
FIG. 5 is a block diagram showing the arrangement of a code printing apparatus according to the second embodiment of the present invention.

FIG. 5 shows the arrangement of a code printing apparatus according to the second embodiment of the present invention, and the apparatus of the second embodiment will be described below. In the first embodiment, the user sets the no-activity period by operating the manual switch. However, in this embodiment, as shown in FIG. 5, the no-activity period is automatically set by arranging a vocal-activity/no-activity period detection unit 19.

The vocal-activity/no-activity period detection unit 19 discriminates, in units of frames, whether or not digital speech information has a predetermined amplitude. More specifically, the unit 19 detects if speech data having an amplitude equal to or larger than a predetermined threshold value is present in each frame. Alternatively, the unit 19 executes processing for determining a vocal-activity/no-activity period by discriminating whether or not the amount of integrated power in each frame is larger or smaller than a predetermined threshold value, and outputs the detected information to the multiplexer 10. At the same time, the vocal-activity/no-activity period detection unit 19 controls via a switch 18 whether or not information stored in the memory 7 is to be output to the speech compression unit 9. That is, upon detecting a vocal-activity frame, the unit 19 controls the switch 18 to connect the memory 7 to the speech compression unit 9; upon detecting a no-activity frame, the unit 19 controls the switch 18 not to connect the memory 7 to the speech compression unit 9. Since the subsequent processing is the same as that in the first embodiment described above, a detailed description thereof will be omitted.

Figure 6:
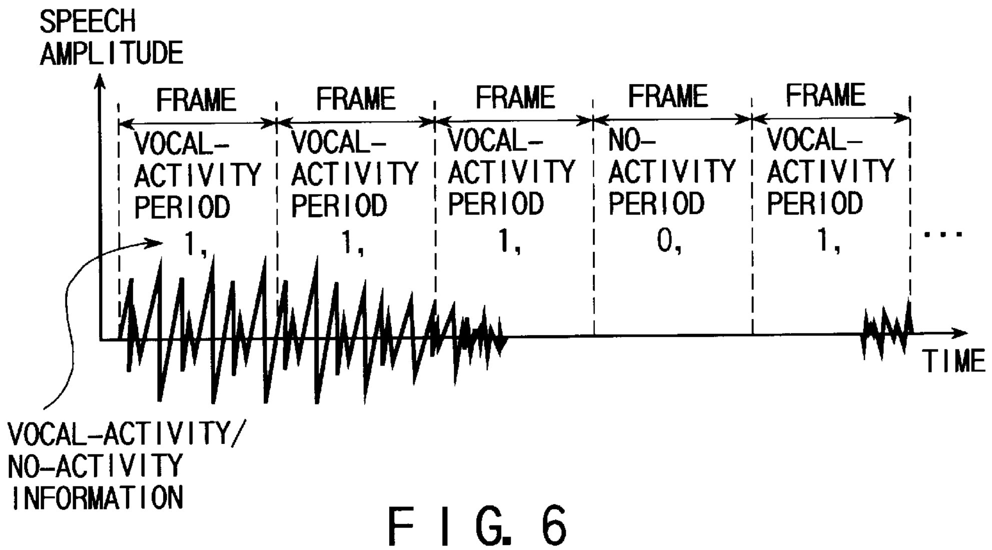
FIG. 6 is a chart for explaining the processing of a vocal-activity/no-activity period detection unit 19.

The processing of the vocal-activity/no-activity period detection unit 19 will be described in more detail below with reference to FIG. 6. The processing of the unit 19 is basically the same as that shown in FIG. 4 described above, but is characterized in that the amplitude is detected in units of frames, and a frame from which a certain amplitude is detected is automatically determined as a vocal-activity period, and a frame from which no amplitude is detected is automatically determined as a no-activity period.

As described above, according to the second embodiment, since the vocal-activity/no-activity information is automatically detected in units of frames, even a portion that cannot be controlled manually can be discarded, and storage of code information and printing of codes can be attained more efficiently.

Figure 7:
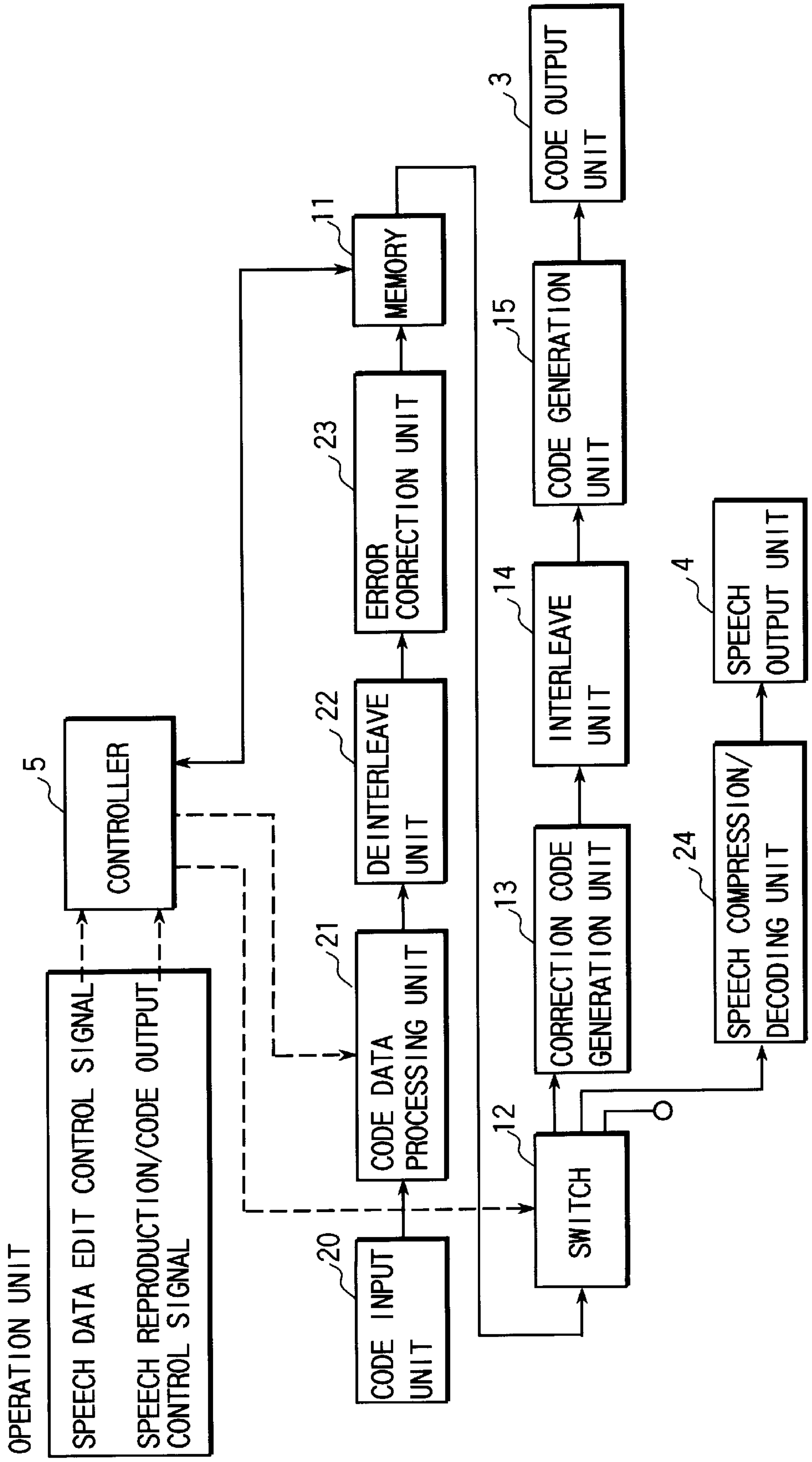
FIG. 7 is a block diagram showing the arrangement of a code printing apparatus according to the third embodiment of the present invention.

FIG. 7 shows the arrangement of a code printing apparatus according to the third embodiment of the present invention, and the apparatus of the third embodiment will be described below. In this embodiment, a code input unit 20 optically reads a code as an image to obtain speech data corresponding to the read code.

Figure 8A:
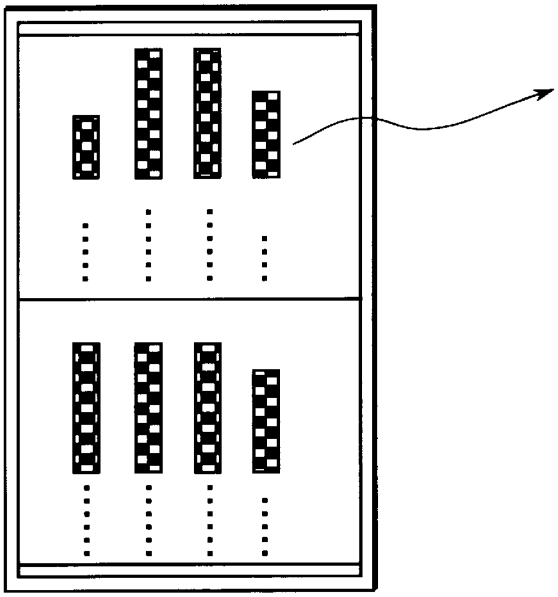
FIG. 8A is a view showing a set of code samples.
Figure 8B:
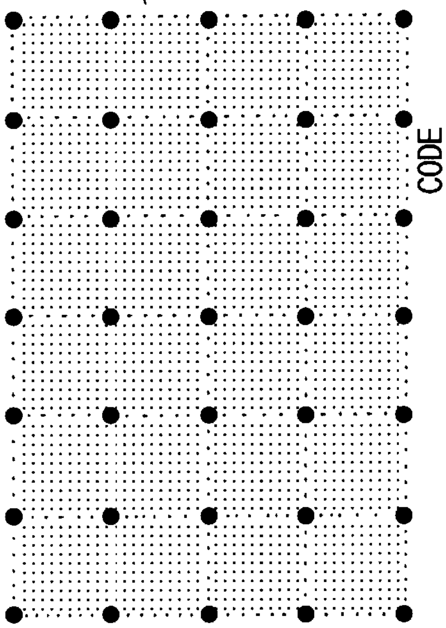
FIG. 8B is a view showing codes making up each code sample.
Figure 8C:
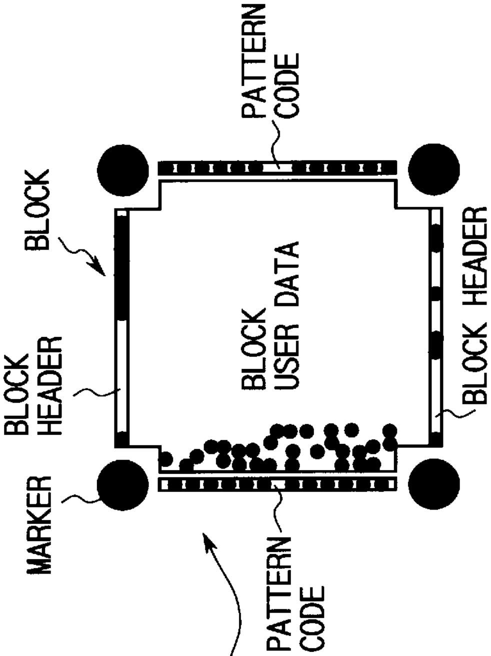
FIG. 8C is a view showing the code format.

In practice, the code input unit 20 reads a desired one of a set of code samples shown in FIG. 8A. A set of code samples includes a large number of codes shown in FIG. 8B, and each code consists of markers for determining the dot sampling reference position in each block, a pattern code, and a block header including the address of the corresponding block. Since such code has already been disclosed in Jpn. Pat. Appln. KOKAI Publication No. 6-231466, a description thereof will be omitted.

The read code data is output to a code data processing unit 21, which detects blocks in the read code and demodulates modulated data. Thereafter, the unit 21 outputs the demodulated data to a deinterleave unit 22.

The deinterleave unit 22 re-arranges interleaved information to convert it into data in a predetermined error correction unit, and outputs the converted data to an error correction unit 23. The error correction unit 23 error-corrects the data in the predetermined error correction unit, and outputs significant information except for the parity to the memory 11. That is, speech information is stored in the memory 11.

For example, when a plurality of codes are read, and the processing order of the read codes is to be controlled, a speech data edit control signal is input to the controller 5, which controls the memory 11 to perform editing such as re-arranging. Upon completion of editing, speech data stored in the memory 11 is input to the switch 12. Since the subsequent processing is the same as that in the first embodiment described above, a detailed description thereof will be omitted.

As described above, according to the third embodiment, an existing code can be read and edited to generate a new code. Hence, copying, editing, and the like of the code can be easily attained.

Figure 9:
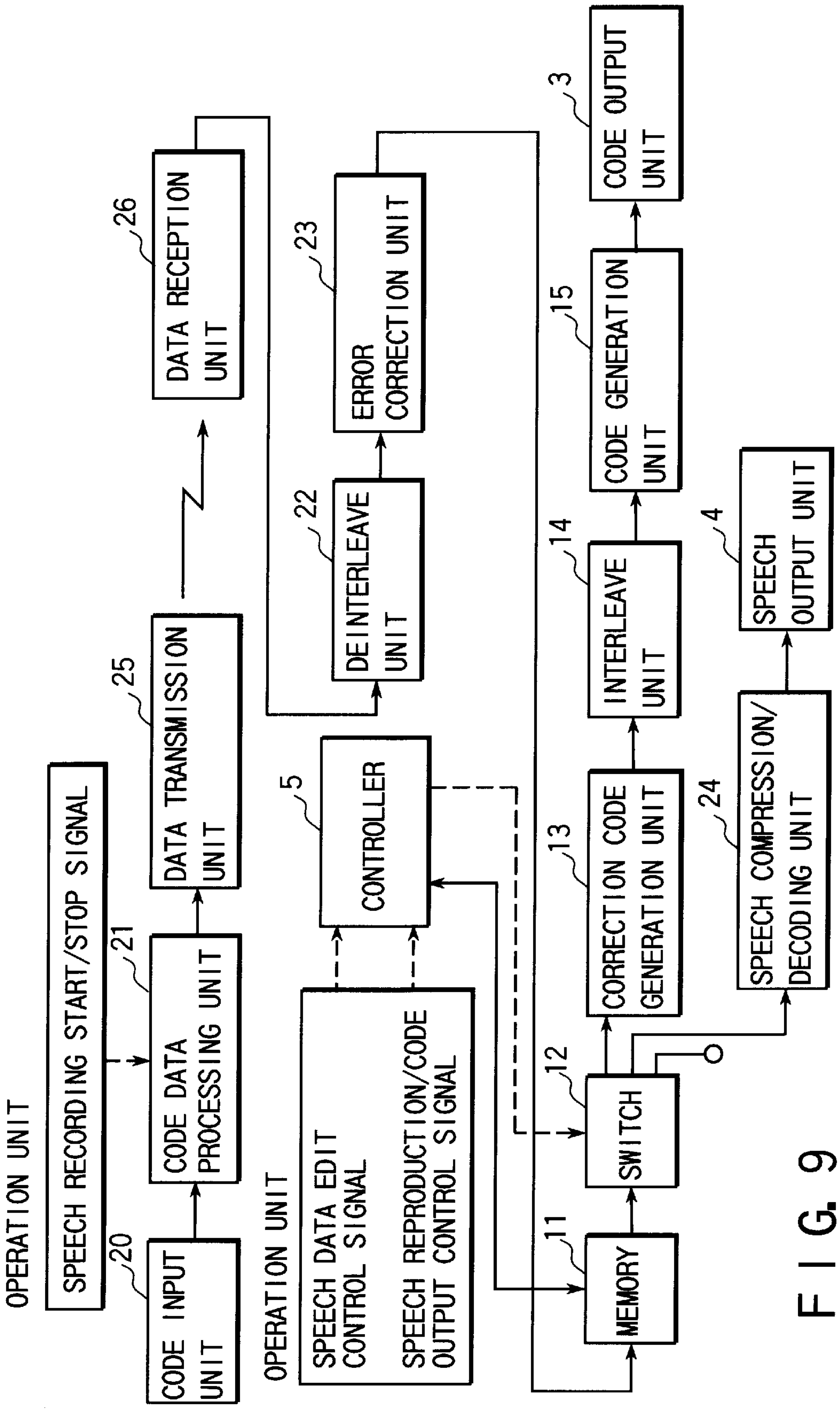
FIG. 9 is a block diagram showing the arrangement of a code printing apparatus according to the fourth embodiment of the present invention.
Figure 10:
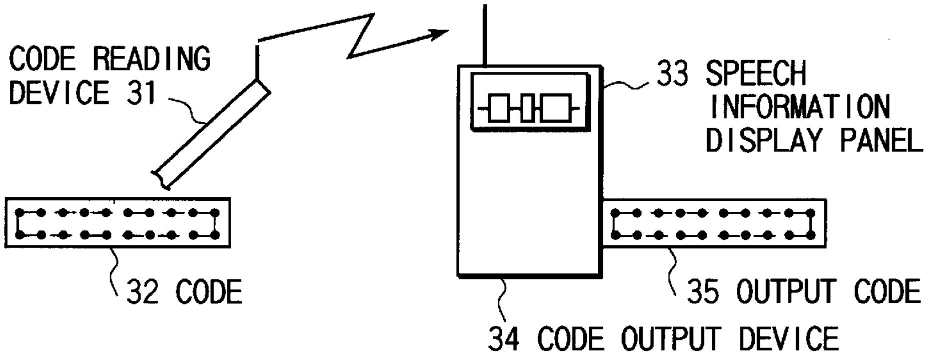
FIG. 10 is a schematic view showing the code printing apparatus according to the fourth embodiment.

FIGS. 9 and 10 show the arrangement of a code printing apparatus according to the fourth embodiment of the present invention, and the apparatus of the fourth embodiment will be described below. FIG. 9 is a block diagram showing the arrangement of this embodiment, and FIG. 10 is a schematic view.

The code printing apparatus comprises a code reading device 31 and a code output device 34. Data of a code 32 read by the code reading device is output to the code output device via, e.g., radio waves, and the code output device prints an output code 35.

The code reading device 31 is built by integrating the code input unit 20, the code data processing unit 21, and a data transmission unit 25. The code output device 34 has a data reception unit 26, and also has the same arrangement as in the third embodiment to print the code.

In this arrangement, when the code 32 is read by the code reading device 31, the read code is transmitted via radio waves, and is displayed on a speech information display panel 33 in a predetermined format. Also, the read code is subjected to, e.g., editing, and thereafter, the output code 35 is printed.

Figure 11:
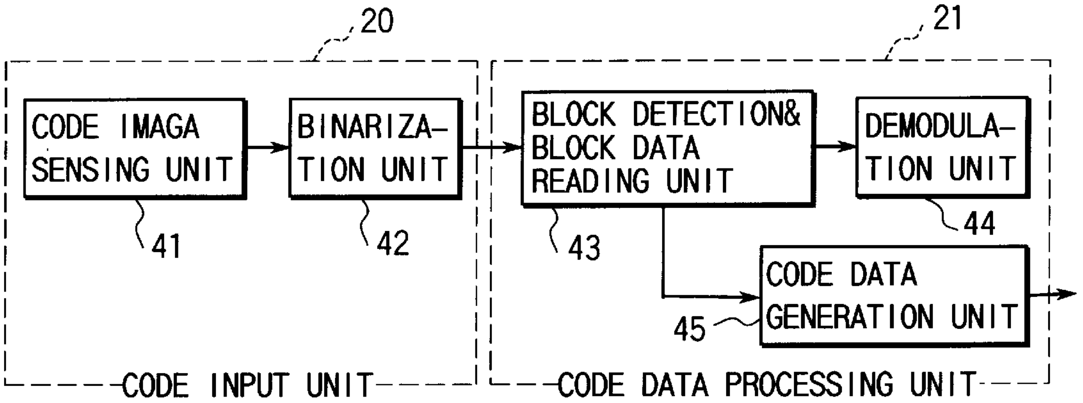
FIG. 11 is a block diagram showing in detail the arrangement of a code reading device 31.

FIG. 11 shows in detail the arrangement of the code reading device 31, and the device 31 will be described below. Referring to FIG. 11, in the code input unit 20, a code image sensing unit 41 senses an image of the code 32, and thereafter, a binarization unit 42 binarizes the sensed code.

In the code data processing unit 21, a binary image, which is sensed and binarized as a two-dimensional image in the code input unit 20, is input to a block detection & block data reading unit 43, which detects blocks from the input image. Data in the detected blocks are sequentially read, and the read data are output to a demodulation unit 44 and a code data generation unit 45.

Data to be input to the demodulation unit 44 are those which are modulated upon recording, and data to be input to the code data generation unit 45 are block headers which are not modulated upon recording. The modulated block data are input to the demodulation unit 44 and are demodulated. The demodulated data are input to the code data generation unit 45.

The code data generation unit 45 links the individual block data in the order of block addresses indicated by their block headers. In this case, the data generated by the code data generation unit 45 includes an error correction code. Also, uncorrected data is output to the data transmission unit 25.

The data transmission unit 25 modulates the input data to radio waves in the case of radio communications, and outputs the radio waves. The radio wave signal is received by the data reception unit 26. The data reception unit 26 temporarily demodulates the received information, and the deinterleave unit 22 converts the demodulated information into data in an error correction unit. The unit 22 outputs the converted data to the error correction unit 23. The error correction unit 23 performs error correction of the input data. Since the subsequent processing is the same as that in the third embodiment mentioned above, a detailed description thereof will be omitted.

As described above, according to the fourth embodiment, even when errors are superposed on signals transmitted via radio communications, the error correction unit in the code output device side can error-correct them, and the reading operability of a code pattern image by the user can be improved.

Figure 12:
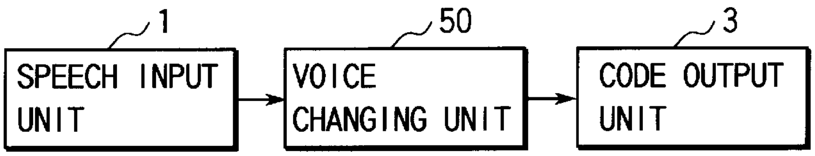
FIG. 12 is a block diagram showing the arrangement of a code printing apparatus according to the fifth embodiment of the present invention.

FIG. 12 shows the arrangement of a code printing apparatus according to the fifth embodiment of the present invention, and the apparatus of the fifth embodiment will be described below. As shown in FIG. 12, the apparatus of this embodiment comprises the speech input unit 1, a voice changing unit 50 for changing speech data, and the code output unit 3. The voice changing unit 50 changes input speech data itself. For example, the unit 50 can change a man's voice to a woman's voice or vice versa, and can also change a given voice to one having a quite different nature. The speech data changed by the voice changing unit 50 is input to the code output unit 3, which outputs the input speech data as a code.

Figure 13:
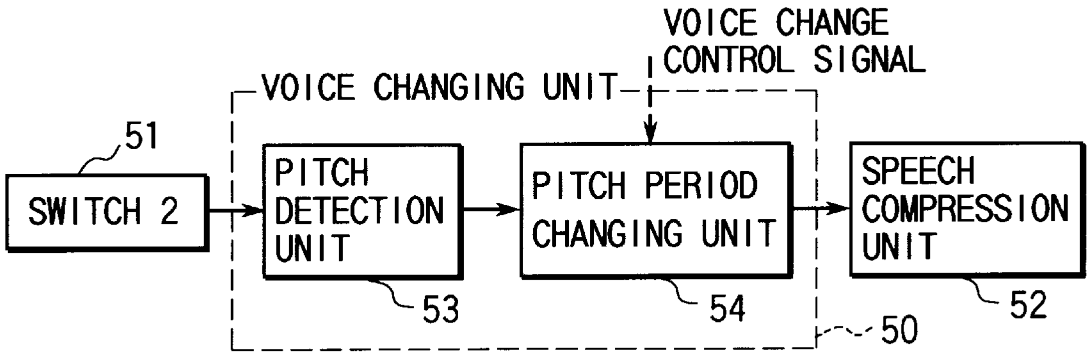
FIG. 13 is a block diagram showing in detail the arrangement of principal part of a voice changing unit 50.

FIG. 13 shows in more detail the arrangement of the voice changing unit 50. As shown in FIG. 13, digital speech data corresponding to vocal activities input to a switch 51 is input to a pitch detection unit 53 to detect a pitch period. A pitch period changing unit 54 changes the detected pitch period, and outputs the changed data to a speech compression unit 52.

Figure 14:
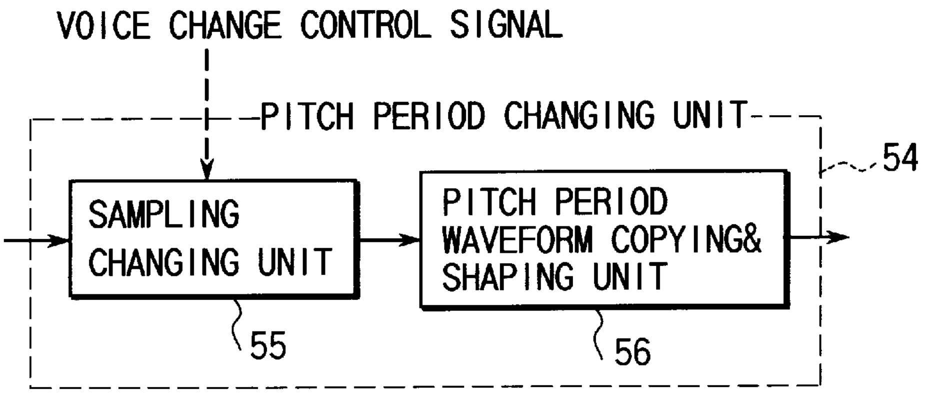
FIG. 14 is a block diagram showing in detail the arrangement of a pitch period changing unit 54.

Furthermore, FIG. 14 shows in more detail the arrangement of the pitch period changing unit 54, and the unit 54 will be described below. As shown in FIG. 14, when the detection signal of the vocal-activity period position is input, speech data is input to a sampling changing unit 55, and is changed by sampling. More specifically, two or three samples are thinned out from speech data sampled at, e.g., 8 kHz to change sampling.

Figure 15A:
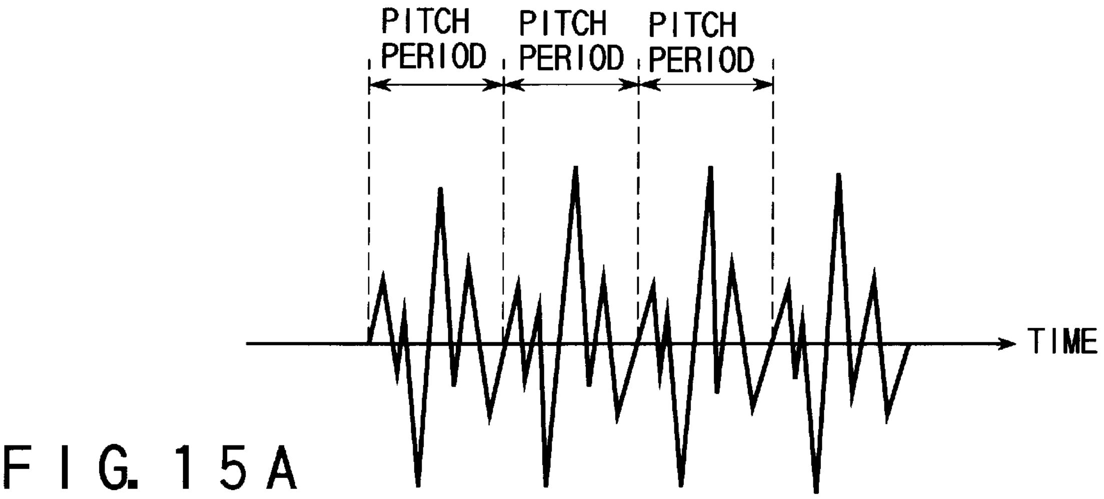
FIG. 15A is a chart showing a periodical speech waveform.
Figure 15B:
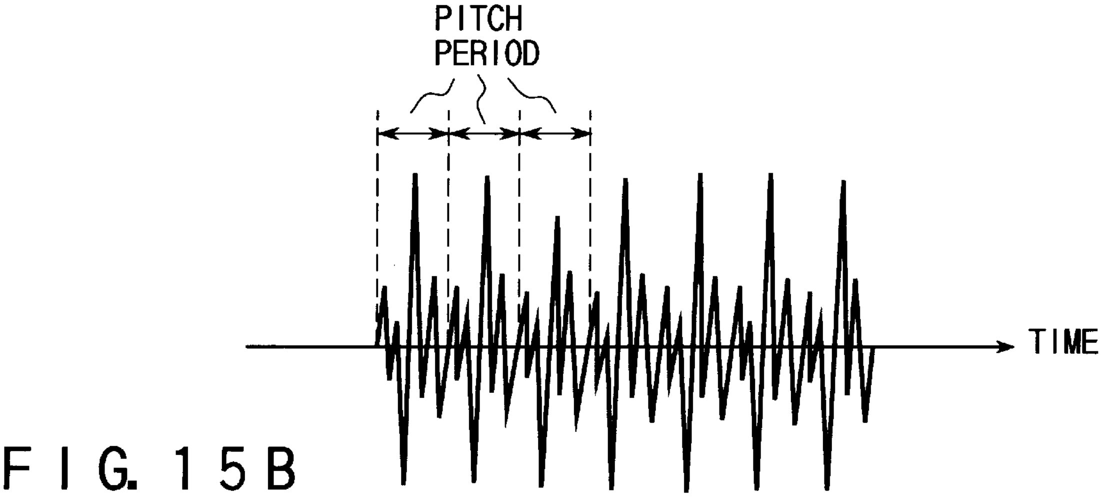
FIG. 15B is a chart showing the speech waveform after every third sample is thinned out.

That is, the waveform in the vocal-activity period shown in FIG. 15A includes a sequence of periodic speech waveforms, and this interval corresponds to the pitch period. The pitch period is detected by the pitch detection unit 53. When the sampling changing unit 55 thins out every third samples, each pitch period narrows, as shown in FIG. 15B.

For example, when each pitch period consists of 30 samples, since every third samples are thinned out, the pitch period consists of 20 samples after thinning out. More specifically, when every third samples are thinned out, the pitch period narrows to ⅔.

The data after thinning out is input to a pitch period waveform copying & shaping unit 56 to copy a pitch period waveform with a shortened pitch period. More specifically, one pitch period waveform is copied after two pitch period waveforms. If the pitch period is halved, the halved pitch period waveform is copied, and the copy is inserted into the halved waveform to obtain the same length as that of the input speech data. More specifically, although the length of the entire speech data remains the same, a low voice is changed to a high voice in terms of frequency, and the speaking speed itself is left unchanged.

The processed speech data is input to the speech compression unit 52. In this manner, a man's voice can be changed to a woman's voice. On the other hand, when the pitch period is prolonged using a scheme opposite to that described above, a woman's voice can be changed to a man's voice. That is, the tone of speech data can be changed.

Figure 16:
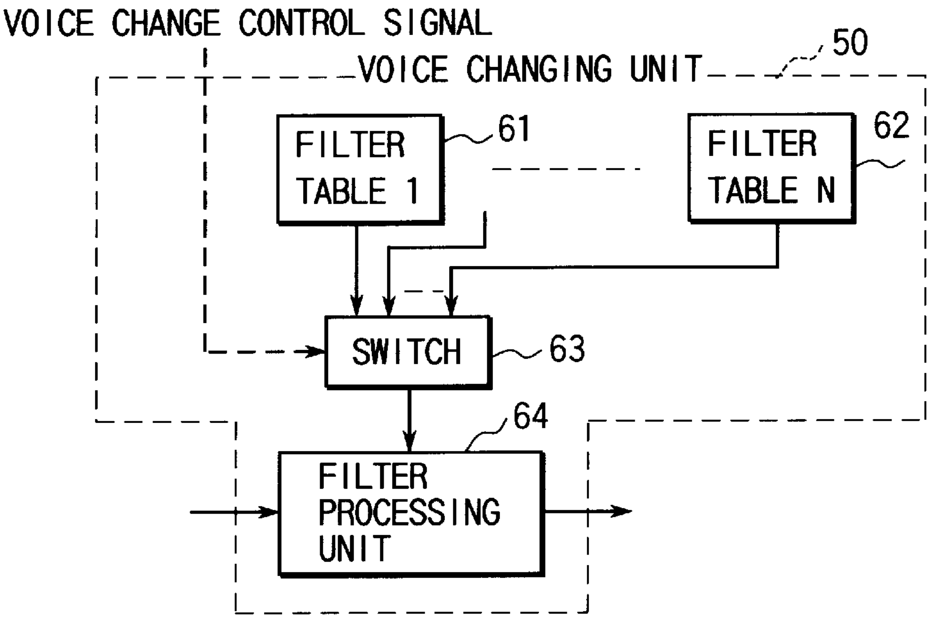
FIG. 16 is a block diagram showing the arrangement of principal part of the voice changing unit 50.

FIG. 16 shows another arrangement of the voice changing unit 50, and the unit 50 with this arrangement will be described below.

As shown in FIG. 15, input speech data is input to a filter processing unit 64, and a switch 63 is switched in accordance with a voice change control signal. Upon switching, filter tables 61, . . . , 62 to be used are selected. By changing speech data on the basis of the selected table, processing for emphasizing the bass or treble of the speech data can be attained.

Figure 17:
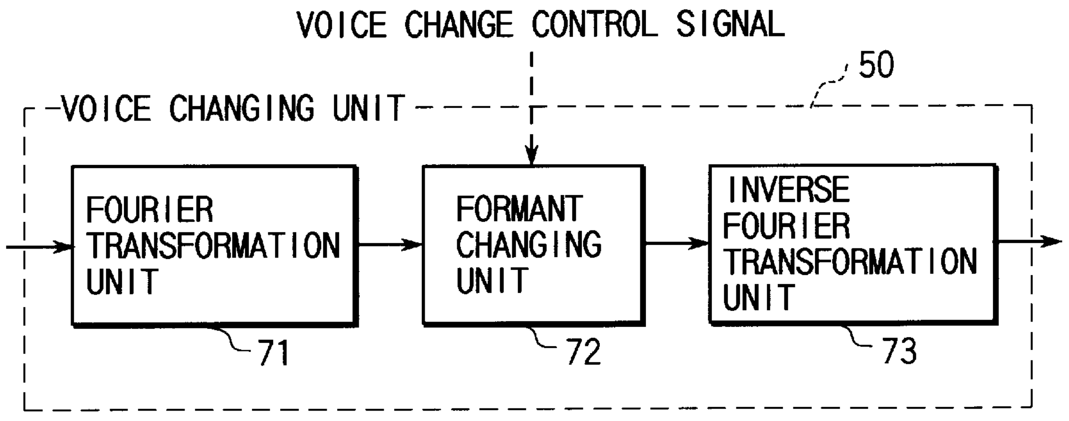
FIG. 17 is a block diagram showing the arrangement of principal part of the voice changing unit 50.

FIG. 17 shows still another arrangement of the voice changing unit 50, and the unit 50 with this arrangement will be described below.

As shown in FIG. 17, input speech data corresponding to vocal activities is Fourier-transformed by a Fourier transformation unit 71, and the waveform of the frequency plane of the transformed data is changed by a formant changing unit 72. The changed data is input to an inverse Fourier transformation unit 73, and is subjected to inverse Fourier transformation to reconstruct the original data. The reconstructed data is then output.

The processing of the voice changing unit 50 shown in FIG. 17 will be described below with reference to FIGS. 18A to 18D. When a speech signal shown in FIG. 18A is input in units of frames and is Fourier-transformed at predetermined intervals, a waveform shown in FIG. 18B is obtained. When a speech signal is Fourier-transformed, frequency components are extracted, and the peak positions in FIG. 18B correspond to the formant positions. The formant changing unit described above performs processing for shifting these peak positions, as shown in FIG. 18C. When the processed data is subjected to inverse Fourier transformation, it is recorded as another speech data. When the shift amount of formant positions is recorded as control information (header information), original speech data can be reconstructed from the processed speech data. By changing the formant positions, not only the speech data but also the contents thereof can be changed, thus generating nonsense speech data. With this processing, speech data can be encrypted, and the encrypted data can be decrypted using the formant shift amount as a key. The encryption key is recorded as header information, and when an identification number or the like is input at the reproduction device side, original speech data can be reconstructed based on the key.

Figure 19:
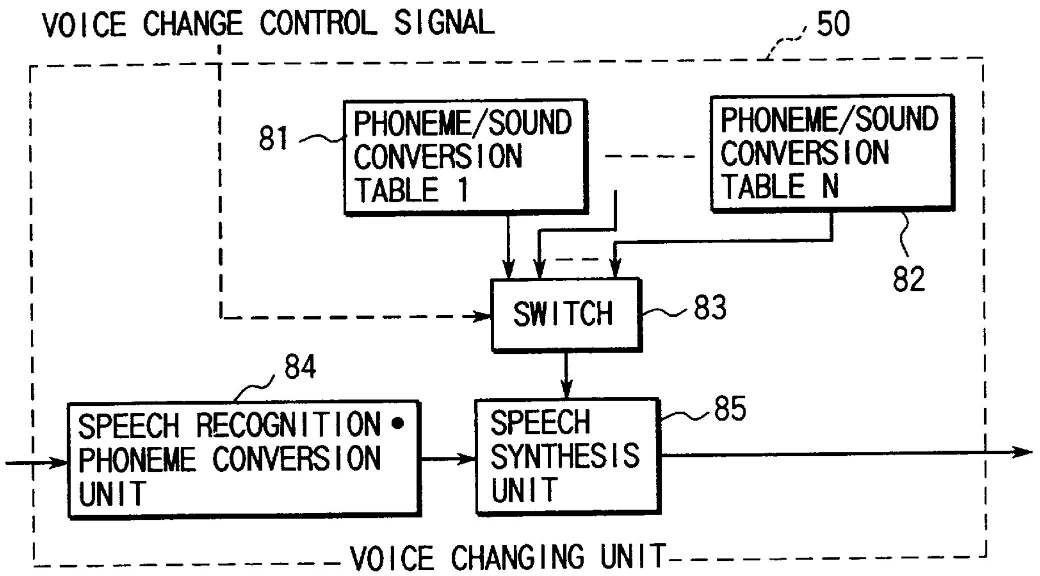
FIG. 19 is a block diagram showing another arrangement of the voice changing unit 50.

FIG. 19 shows still another arrangement of the voice changing unit 50, and the unit 50 with this arrangement will be described below.

As shown in FIG. 19, when speech data in the vocal-activity period is input to a speech recognition-phoneme conversion unit 84, the contents of speech data are recognized, and if the contents include "A", a phoneme "éi" is output to a speech synthesis unit 85. The speech synthesis unit 85 controls a switch 83 in correspondence with the phoneme "éi" to select one of a phoneme/sound conversion tables 81, . . . , 82, and converts the phoneme into a corresponding sound with reference to the selected table (81, 82, or the like), thus outputting the converted sound. A plurality of phoneme/sound conversion tables 81, . . . , 82 are prepared to convert an input phoneme into a man's voice, woman's voice, specific person's voice, and the like, and can be arbitrarily selected.

As described above, according to the fifth embodiment, the user can select various types of voices in correspondence with his or her purpose of use of the code, and can enjoy a voice different from the input voice.

Figure 20:
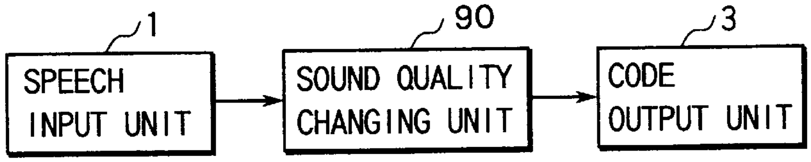
FIG. 20 is a block diagram showing the arrangement of a code printing apparatus according to the sixth embodiment of the present invention.

FIG. 20 shows the arrangement of a code printing apparatus according to the sixth embodiment of the present invention, and the apparatus of the sixth embodiment will be described below. As shown in FIG. 20, the apparatus of this embodiment comprises the speech input unit 1, a sound quality changing unit 90, and the code output unit 3. The sound quality changes the sound quality of input speech data.

Figure 21:
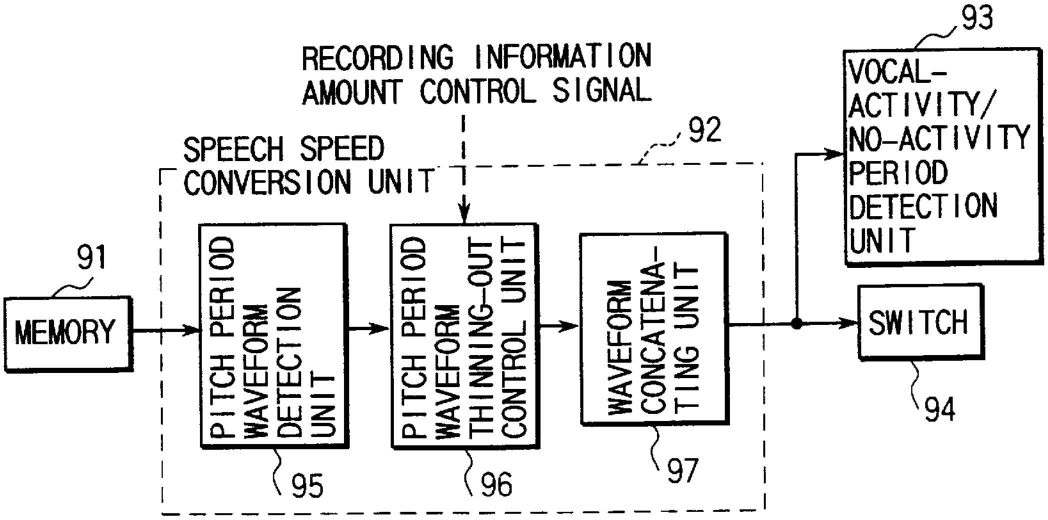
FIG. 21 is a block diagram showing in detail the arrangement of a sound quality changing unit 90.

FIG. 21 shows another arrangement of the code printing apparatus according to the sixth embodiment, and the apparatus with this arrangement will be described below. As shown in FIG. 21, the output of a memory 91 is connected to the input of a speech speed conversion unit 92, and the output of the speech speed conversion unit 92 is connected to the inputs of a vocal-activity/no-activity period detection unit 93 and a switch 94. The speech speed conversion unit 92 comprises a pitch period waveform detection unit 95, a pitch period waveform thinning-out control unit 96, and a waveform concatenating unit 97.

In this arrangement, digital speech data stored in the memory 91 is input to the pitch period waveform detection unit 95 to detect the positions of pitch period waveforms. The detected signals are input to the pitch period waveform thinning-out control unit 96, which calculates the thin-out amount based on a recording information amount control signal. Then, the pitch period waveform thinning-out control unit 96 thins out the input waveforms, and inputs the thinned-out waveforms to the waveform concatenating unit 97. The unit 97 concatenates the input waveforms by deleting the thinned-out portions, and outputs the concatenated speech data to the switch 94 or the vocal-activity/no-activity period detection unit 93.

The above-mentioned processing will be described in detail below with reference to FIGS. 22A to 22C.

Figures 22A, 22B, 22C:
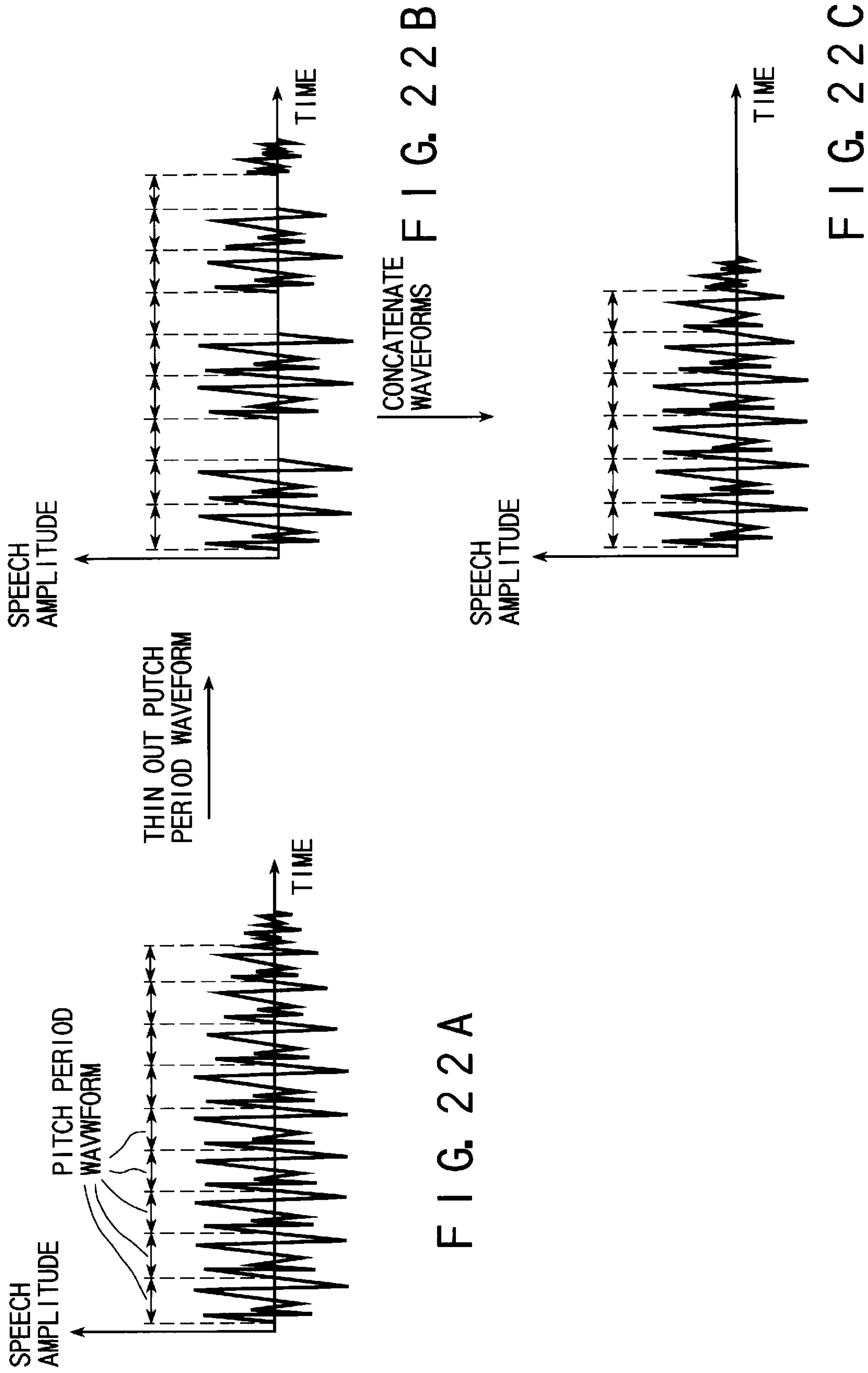
FIG. 22A is a chart showing speech data including a sequence of a plurality of periodic waveforms at the same pitch.
FIG. 22B is a chart showing the state wherein every third waveform in the speech data in FIG. 22A is thinned out.
FIG. 22C is a chart showing the state wherein the waveforms shown in FIG. 22B are concatenated.

When the every third waveforms of speech data including a sequence of a plurality of pitch period waveforms, as shown in FIG. 22A, are thinned out, the waveforms shown in FIG. 22B are obtained. When the waveforms are concatenated by deleting the thinned-out portions, speech information is shortened, as shown in FIG. 22C.

As described above, according to the sixth embodiment, the processing for increasing the speech speed without changing the contents of speech data can be attained. With this processing, the area required for recording a code corresponding to speech data with identical contents can be reduced.

Figure 23:
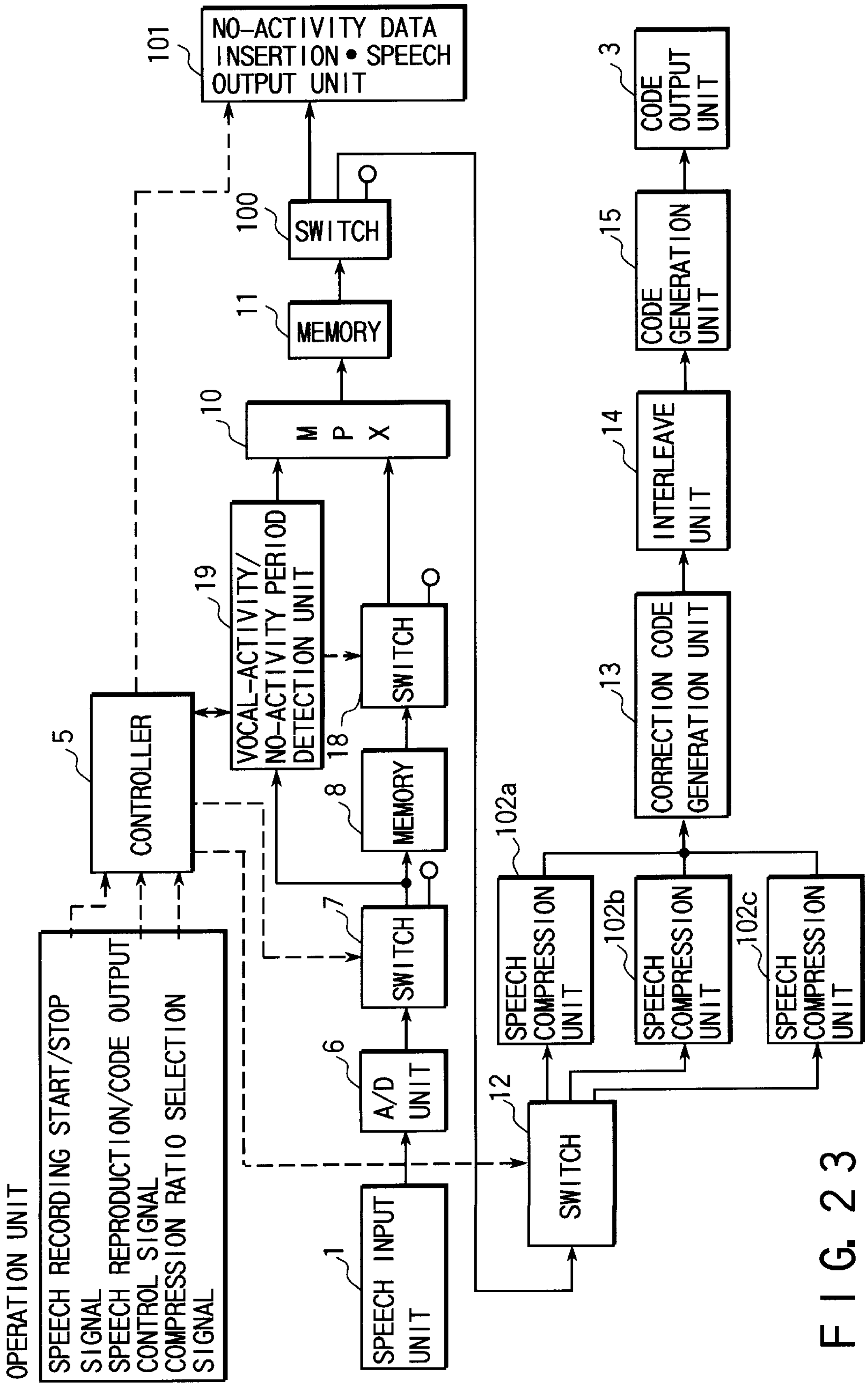
FIG. 23 is a block diagram showing the arrangement of a code printing apparatus according to the seventh embodiment of the present invention.

FIG. 23 shows the arrangement of a code printing apparatus according to the seventh embodiment of the present invention, and the apparatus of the seventh embodiment will be explained below. As shown in FIG. 23, this code printing apparatus is characterized in that the output from a switch 100 is input to one of three speech compression units 102*a*, 102*b*, and 102*c* via the switch 12. In this case, which one of the speech compression units 102*a*, 102*b*, and 102*c* is to be selected is controlled by the controller 5 on the basis of a compression ratio selection signal input when the user selects a switch (not shown).

Since the processing after data compressed by one of the compression units 102*a*, 102*b*, and 102*c* is input to the correction code generation unit 13 is the same as that in the first embodiment mentioned above, a detailed description thereof will be omitted. In this embodiment, the speech compression units 102*a*, 102*b*, and 102*c* respectively correspond to a "long-time mode" which allows long-time recording by setting a high compression ratio to increase the recording density although the sound quality deteriorates slightly, a "standard mode" with standard sound quality and recording density, and a "sound quality priority mode" which sets priority to the sound quality over the recording density, which are selected by the user.

Figure 24:
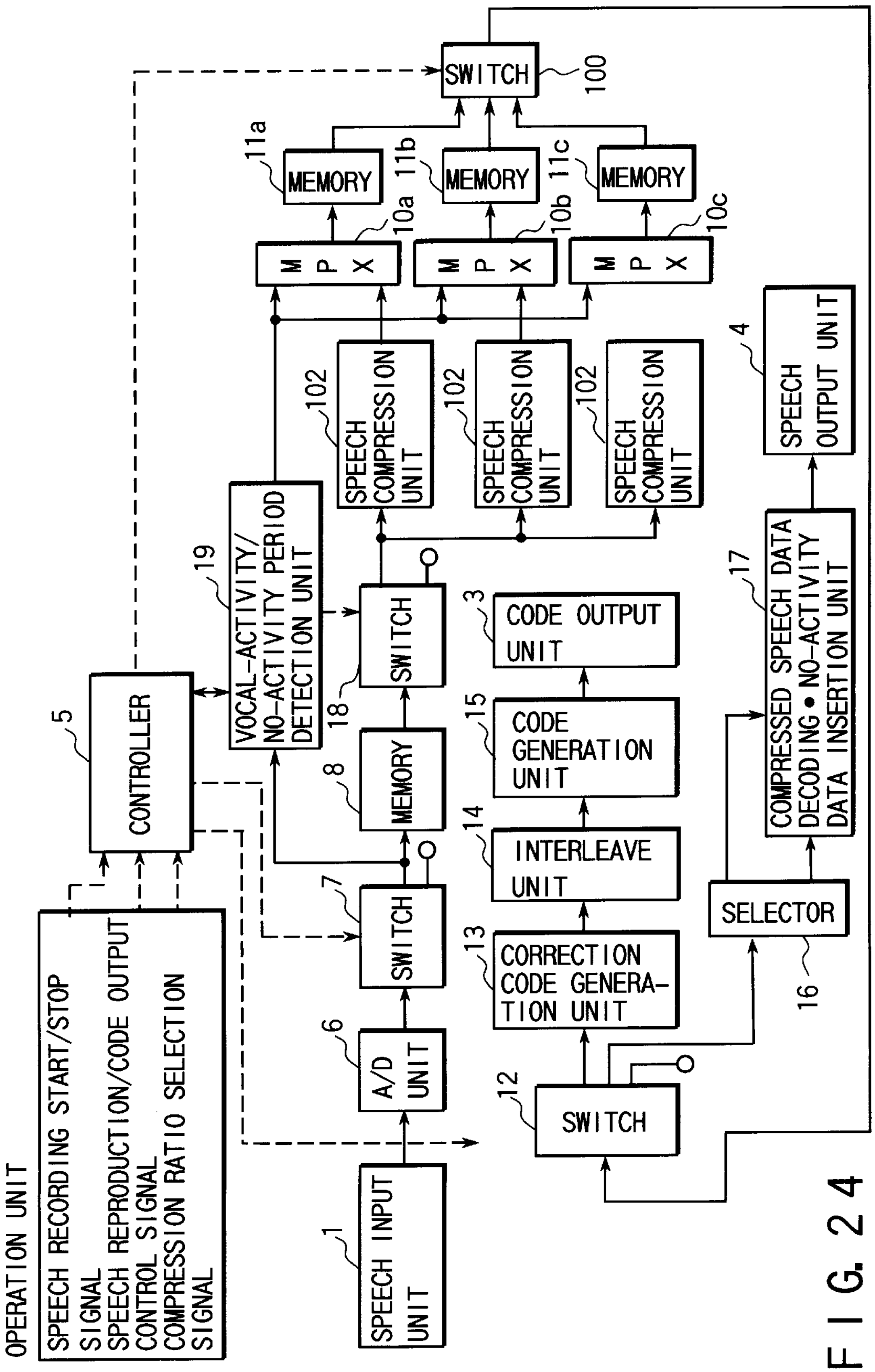
FIG. 24 is a block diagram showing another arrangement of the seventh embodiment.

FIG. 24 shows another arrangement of the seventh embodiment, and the apparatus with this arrangement will be described below.

As shown in FIG. 24, in this code printing apparatus, speech information is input to the speech compression units 102*a*, 102*b*, and 103*b* via the switch 18, and is compressed at the respective compression ratios. Thereafter, the individual compressed data are stored in memories 11$a$, 11$b$, and 11$c$ via multiplexers 10$a$, 10$b$, and 10$c$. When the user selects a desired compression ratio by operating a switch (not shown), a compression ratio selection signal is input to the controller 5 to operate the switch 12, thus reading out speech information stored in one of the memories 11$a$, 11$b$, and 11$c$. Since the subsequent processing is the same as that in the first embodiment, a detailed description thereof will be omitted.

In the above-mentioned arrangement shown in FIG. 23, the user cannot hear the compressed speech data before printing, but in the arrangement shown in FIG. 24, the user can hear and confirm the actual sound of the compressed speech data before printing. However, the hardware scale in FIG. 23 is smaller than that in FIG. 24.

As described above, according to the seventh embodiment, since the user can change the compression ratio of speech information to a desired one, he or she can freely select the priority levels of sound quality and the region required for printing a code pattern image, and can print speech information on a medium as an optically readable code pattern image.

According to the present invention, a code printing apparatus, which allows the user to easily use a function of printing speech data or the like as an optically readable code, and to efficiently print speech information within a limited printing region, can be provided.

Note that the gist of the present invention can be summarized as follows.

(1) A code printing apparatus, which comprises speech input means for inputting speech information and code printing means for printing the speech information input by the speech input means on a medium as an optically readable code pattern image, is characterized by comprising:

an operation unit, and speech code printing control means for controlling the code printing means to print the speech information input by the speech input means on the medium as a corresponding code pattern image on the basis of an input operation at the operation unit.

With this arrangement, speech information can be easily printed on the medium as an optically readable code pattern image in accordance with the operator's will.

(2) The code printing apparatus described in (1) is characterized by further comprising speech output means for outputting the speech information input by the speech input means, and the speech code printing control means comprises selection means for selectively supplying the input speech information to one of the speech output means and the code printing means on the basis of an input operation at the operation means.

With this arrangement, speech data to be printed on the medium as a code pattern information can be easily and selectively recognized as needed.

(3) The code printing apparatus described in (1) or (2) is characterized in that the operation unit includes a switch unit for designating to selectively extract only speech information to be printed as a code pattern image on the medium from the speech information input by the speech input means.

With this arrangement, the user can freely extract significant speech information to be printed by a manual operation.

(4) The code printing apparatus described in (3) is characterized in that the speech code printing control means further comprises vocal-activity/no-activity information generation means for generating vocal-activity/no-activity information which indicates a no-activity period corresponding to a printing stop period as a non-extraction period of speech information selectively designated by the switch unit, and indicates a vocal-activity period corresponding to a speech printing period as a speech extraction period other than the no-activity period, and the speech code printing control means controls the code printing means to link the vocal-activity/no-activity information generated by the vocal-activity/no-activity information generation means and the extracted speech information during the vocal-activity period, and to print the linked information on the medium as a code pattern image.

With this arrangement, since vocal-activity/no-activity information, which indicates the speech non-extraction period as a no-activity period and the extraction period as a vocal-activity period, and extracted speech information during the vocal-activity period are printed as a code pattern image on the medium, speech information that reflects the operator's will can be efficiently printed within a limited printing region.

(5) The code printing apparatus described in (4) is characterized in that the speech code printing control means further includes timing control means for controlling a switching timing between the no-activity and vocal-activity periods, each of the no-activity and vocal-activity periods being a period corresponding to an integer multiple of a predetermined period of time.

With this arrangement, since the vocal-activity/no-activity period is set to be integer multiples of a predetermined unit time, the insertion control of the no-activity period upon outputting speech data can be easily attained.

(6) The code printing apparatus described in (1) or (2) is characterized in that the speech code printing control means further comprises vocal-activity/no-activity period detection means for detecting a no-activity period and vocal-activity period in the speech information input by the speech input means, and the speech code printing control means controls printing of the code printing means in accordance with a detection result of the vocal-activity/no-activity period detection means.

With this arrangement, since the no-activity and vocal-activity periods can be automatically detected, and speech information is printed on the medium as a code pattern image in accordance with the detection result, speech information can be efficiently printed within a limited printing region.

(7) The code printing apparatus described in (6) is characterized in that the speech code printing control means further comprises vocal-activity/no-activity information generation means for generating vocal-activity/no-activity information indicating a no-activity period and a vocal-activity information detected by the vocal-activity/no-activity period detection means, and the speech code printing control means controls the code printing means to link the vocal-activity/no-activity information generated by the vocal-activity/no-activity information generation means and speech information detected as the vocal-activity period, and to print the linked information on the medium as a code pattern image.

With this arrangement, since the no-activity and vocal-activity periods can be automatically detected, and the vocal-activity/no-activity information and extracted speech information during the vocal-activity period are printed on the medium as a code pattern image, speech information can be efficiently printed within a limited printing region, and a voice equivalent to the input voice can be reconstructed upon outputting the voice.

(8) The code printing apparatus described in (6) or (7) is characterized in that the vocal-activity/no-activity period detection means performs detection in units of periods corresponding to integer multiples of a predetermined period of time.

With this arrangement, since the vocal-activity/no-activity period is set to be an integer multiple of a predetermined unit time, the no-activity period can be easily inserted upon outputting a voice.

(9) The code printing apparatus described in (1) or (2) is characterized in that the speech input means comprises an external input terminal for inputting speech information from an external device connected to the apparatus.

With this arrangement, since the external input terminal is arranged, various speech materials can be printed on the medium as optically readable code pattern images.

(10) The code printing apparatus described in (1) or (2) is characterized in that the speech input means comprises reading means for optically reading a code pattern image printed on a medium, on which speech information is printed as the optically readable code pattern image.

With this arrangement, since a code pattern printed on the medium as an optically readable code pattern image can be read to input speech information, speech information, which has already printed as a code pattern image, can be easily copied and edited.

(11) The code printing apparatus described in (10) is characterized in that the medium comprises a sample medium on which a plurality of kinds of speech information as samples are printed as code pattern images.

With this arrangement, various speech materials can be easily copied and edited, and new speech information matching the user's favor can be printed on the medium as an optically readable code pattern image.

(12) The code printing apparatus described in (10) is characterized in that the reading means comprises transmission means, arranged independently of the apparatus, for transmitting code information based on the read code pattern image to the apparatus via wireless communications, and the apparatus comprises reception means for receiving the code information transmitted by the transmission means.

With this arrangement, since code data read by the reading means for reading an optically readable code pattern image is transmitted to the code printing means via radio communications, the reading operability of the code pattern image of the user can be improved.

(13) The code printing apparatus described in (12) is characterized in that the reading means comprises image sensing means for sensing a code pattern image, and code data generation means for generating code data in a non-error corrected state suitable for transmission by the transmission means by processing code image data based on the code pattern image sensed by the image sensing means, and the code printing apparatus further comprises error correction means for performing error correction after the reception means receives the code data in the non-error corrected state transmitted by the transmission means.

With this arrangement, since the output data from the code reading means is data with a correction parity already added to the code pattern image, an error correction parity need not be added with respect to errors generated during data transmission, and the error correction unit can be shared, thus simplifying the circuit arrangement.

(14) The code printing apparatus described in (2) is characterized in that the speech code printing control means comprises vocal-activity/no-activity information generation means for detecting a vocal-activity period and a no-activity period of the speech information input by the speech input means, and generating vocal-activity/no-activity information indicating the detected periods, and the speech output means comprises no-activity period insertion means for inserting a no-activity portion corresponding to the no-activity period in speech information during the vocal-activity period on the basis of the vocal-activity/no-activity information generated by the vocal-activity/no-activity information generation means upon outputting speech information input by the speech input means.

With this arrangement, since no-activity period insertion means inserts a no-activity period to speech data in the vocal-activity period on the basis of no-activity information, natural output speech data can be obtained.

(15) A code printing apparatus which comprises speech input means, and code printing means for printing the speech information input by the speech input means on a medium as an optically readable code pattern image, is characterized by comprising voice changing means for changing a voice of the speech information input by the speech input means.

With this arrangement, the user can select various types of voices in accordance with his or her purpose of use of the code, and can enjoy a voice different from that of the input voice.

(16) The code printing apparatus described in (15) is characterized in that the voice changing means comprises pitch changing means for changing a pitch period of an input voice or frequency band changing means for changing a frequency band of the input voice.

With this arrangement, the user can select various types of voices in accordance with his or her purpose of use of the code, and can enjoy a voice different from that of the input voice.

(17) The code printing apparatus described in (15) is characterized in that the voice changing means comprises speech recognition means for recognizing the input speech information and converting the recognized speech information into phoneme information, and speech synthesis means for replacing and synthesizing the phoneme information recognized and converted by the speech recognition means with another different phoneme information to output a changed voice.

With this arrangement, the user can select various types of voices in accordance with his or her purpose of use of the code, and can enjoy a voice different from that of the input voice.

(18) A code printing apparatus which comprises speech input means, and code printing means for printing speech information input by the speech input means on a medium as an optically readable code pattern image, is characterized by comprising sound quality changing means for changing sound quality of the speech information input by the speech input means.

With this arrangement, the sound quality of speech data to be printed and the region required for printing a code pattern image can be controlled.

(19) The code printing apparatus described in (18) is characterized in that the sound quality changing means comprises speech speed conversion means for performing speech speed conversion of the input speech information or speech compression means which can change a compression ratio of the input speech information.

With this arrangement, since the user can select speech speed conversion of speech data, speech information can be recorded within a limited predetermined printing region as an optically readable code pattern image while maintaining its contents to be recorded. Since the user can change the compression ratio of speech information, he or she can freely select the priority levels of sound quality and the region required for printing a code pattern image, and can print speech information on the medium as an optically readable code pattern image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A code printing apparatus comprising:

a speech input unit for inputting speech data;

a speech compression unit for compressing the speech data input by said speech input unit;

a memory for storing the speech data compressed by said speech compressing unit;

an interleave unit for rearranging the compressed speech data stored in said memory;

a code generation unit for generating an optically readable code pattern image based on the data rearranged by said interleave unit;

a code output unit for printing the code pattern image generated by said code generation unit on a recording medium;

a compressed speech data decoding unit for decoding the compressed speech data stored in the memory into speech data;

a speech output unit for outputting the speech data decoded by said compressed speech data decoding unit as audible speech;

a switch for enabling a user to set the compressed speech data stored in the memory to be selectively supplied to one of said: (i) said interleave unit when the compressed speech data is to be printed by the code output unit on the recording medium, and (ii) said compressed speech data decoding unit when the compressed speech data is to be output by the speech output unit as audible speech; and a controller for controlling the compressed speech data stored in the memory to be selectively supplied to one of said interleave unit and said compressed speech data decoding unit in accordance with a condition of the switch set by the user.

2. A code printing apparatus according to claim 1, further comprising another switch for enabling the user to selectively designate and extract at least a portion of the speech data input by said speech input unit to be printed by the code output unit on the recording medium.

3. A code printing apparatus according to claim 2, wherein:

said controller generates vocal-activity/no-activity information which indicates an extraction period of the portion of the speech designated by said switch as a vocal-activity period and a non-extraction period of the speech other than the vocal-activity period as a no-activity period; and said code generation unit generates the code pattern image based on the compressed speech data combined with the generated vocal-activity/no-activity information.

4. A code printing apparatus according to claim 3, wherein said controller controls a switching timing between the vocal-activity period and the no-activity period such that each of the vocal-activity period and the no-activity period has a length corresponding to an integer multiple of a predetermined period of time.

5. A code printing apparatus according to claim 1, further comprising:

a vocal-activity/no-activity period detection unit for detecting a vocal-activity period and a no-activity period in the speech data input by the speech input unit;

wherein said controller generates vocal-activity/no-activity information indicating each of the vocal-activity period and the no-activity period detected by said vocal-activity/no-activity period detection unit; and wherein said code generation unit generates the code pattern image based on the compressed speech data combined with the generated vocal-activity/no-activity information.

6. A code printing apparatus according to claim 5, wherein said vocal-activity/no-activity period detection unit conducts a detection operation at periods corresponding to an integer multiple of a predetermined length of time.

7. A code printing apparatus according to claim 1, further comprising a voice changing unit for changing the speech data input by said speech input unit.

8. A code printing apparatus according to claim 7, wherein said voice changing unit includes one of a pitch period changing unit for changing a pitch period of the input speech data, and a frequency band changing unit for changing a frequency band of the input speech data.

9. A code printing apparatus according to claim 7, wherein said voice changing unit includes a speech recognition unit for recognizing the input speech data and converting the recognized speech into phonemes, a speech synthesis unit for replacing the phonemes converted by said speech recognition unit with different phonemes to thereby synthesize and output a new set of phonemes.

10. A code printing apparatus according to claim 1, further comprising a sound quality changing unit for changing a sound quality of the speech data input by the speech input unit.

11. A code printing apparatus according to claim 10, wherein said sound quality changing unit includes one of a speech speed conversion unit for converting a speech speed of the input speech data, and a speech compression unit for changing a compression ratio of the input speech data.

12. A code printing apparatus according to claim 1, wherein said speech input unit includes an external input terminal for inputting the speech data from an external device connected to said apparatus.

13. A code printing apparatus according to claim 1, further comprising:

a vocal-activity/no-activity period detection unit for detecting a vocal-activity period and a no-activity period in the speech data input by the speech input unit;

wherein the controller generates vocal-activity/no-activity information indicating each of the vocal-activity period and the no-activity period detected by said vocal-activity/no-activity period detection unit; and wherein said compressed speech data decoding unit inserts the speech data during the no-activity period into the speech data during the vocal-activity period based on the generated vocal-activity/no-activity information.

14. A code printing apparatus comprising:

a code input unit for optically reading from a recording medium an optically readable code pattern image representing speech data;

a memory for storing processed speech data output by the data processing unit;

an interleave unit for rearranging the processed speech data stored in said memory;

a code generation unit for generating a new optically readable code pattern image based on the data rearranged by said interleave unit;

a code output unit for printing the new optically readable code pattern image generated by the code generation unit on a recording medium;

a decoding unit for decoding the processed speech data decoded unit as audible speech;

a speech output unit for outputting the speech data decoded by said compressed speech data decoding unit as audible speech;

a switch for enabling a user to set the processed speech data stored in the memory to be selectively supplied to one of said; (i) said interleave unit when the processed speech data is to be printed by the code output unit an the recording medium, and (ii) said decoding unit when the processed speech data is to be output by the speech output unit as audible speech; and a controller for controlling the processed speech data stored in the memory to be selectively supplied to one of said interleave gait and said decoding unit in accordance with a condition of the switch set by the user.

15. A code printing apparatus according to claim 14, wherein:

said code input unit and said code data processing unit are arranged in a reading device which is provided separately from a main body of said code printing apparatus; and said reading device includes a data transmission unit for transmitting the code pattern image read by said code input unit to a data reception unit which is provided in said main body of said code printing apparatus.

16. A code printing apparatus according to claim 15, wherein:

said code data processing unit genera test data in an error-uncorrected state suitable for data transmission by said data transmission unit; and said main body of said code printing apparatus includes an error correction unit for performing error correction on the data in the error-uncorrected state received by the data reception unit.

* * * * *